(12) United States Patent
Jeung (10) Patent No.: US 8,456,043 B2
(45) Date of Patent: Jun. 4, 2013

(54) ROTOR OF BRUSHLESS DIRECT CURRENT MOTOR HAVING SOUND ABSORBING RESIN PORTION

(76) Inventor: Young-Chun Jeung, Cypress, CA (US)

( * ) Notice: Subject to any disclaimer, the term of this patent is extended or adjusted under 35 U.S.C. 154(b) by 137 days.

(21) Appl. No.: 12/801,023

(22) Filed: May 17, 2010

(65) Prior Publication Data

US 2010/0225192 A1    Sep. 9, 2010

Related U.S. Application Data

(62) Division of application No. 11/896,454, filed on Aug. 31, 2007, now abandoned.

(30) Foreign Application Priority Data

May 11, 2007   (KR) .......................... 10-2007-0045977

(51) Int. Cl.
*H02K 5/24* (2006.01)
*H02K 1/27* (2006.01)

(52) U.S. Cl.
USPC .......................................... 310/51; 310/156.43

(58) Field of Classification Search
CPC ............. H02K 1/27; H02K 21/12; H02K 5/24
USPC ................... 310/156.43, 156.22, 156.74, 51, 310/91
IPC ..................................... H02K 1/27, 21/12, 5/24
See application file for complete search history.

(56) References Cited

U.S. PATENT DOCUMENTS

| 4,049,985 | A | * | 9/1977 | Sudler | 310/51 |
| 5,204,572 | A | * | 4/1993 | Ferreira | 310/156.19 |
| 5,666,015 | A | * | 9/1997 | Uchibori et al. | 310/51 |
| 5,704,111 | A | * | 1/1998 | Johnson et al. | 310/51 |

(Continued)

FOREIGN PATENT DOCUMENTS

| JP | 58112449 A | * | 7/1983 |
| JP | 01129741 A |   | 5/1989 |

OTHER PUBLICATIONS

Machine translation of JP58-112449A (published Jul. 1983, translated Nov. 2012).*

(Continued)

*Primary Examiner* — Tran Nguyen
*Assistant Examiner* — Michael Andrews
(74) *Attorney, Agent, or Firm* — Staas & Halsey LLP (57) ABSTRACT

A permanent magnet rotor of a brushless direct current (BLDC) motor, in which cogging torque ripple and electromagnetic vibration noise transferred to the permanent magnet rotor can be blocked and a motor's power-to-weight ratio can be improved. A conventional BLDC motor has to use an electric steel sheet core so as to maintain the maximum magnetic flux density of the permanent magnet rotor and to minimize a rotating electric field loss. As a result, cogging torque vibration is unavoidably transferred to a load side through the motor rotary shaft. However, the rotor can enable stable driving of the BLDC motor by innovatively blocking the cogging torque vibration and the electromagnetic vibration noise and can greatly reduce the motor's weight by using a plastic or non-magnetic material instead of an electric steel sheet core.

1 Claim, 10 Drawing Sheets

U.S. PATENT DOCUMENTS

| | | | |
|---|---|---|---|
| 6,376,954 B1 | 4/2002 | Nunes, Jr. | |
| 6,404,086 B1 | 6/2002 | Fukasaku et al. | |
| 7,116,026 B2 * | 10/2006 | Kuwabara et al. | 310/156.21 |
| 8,080,907 B2 * | 12/2011 | Jeung | 310/51 |
| 2001/0048261 A1 * | 12/2001 | Kojima et al. | 310/156.13 |
| 2005/0001502 A1 | 1/2005 | Yamazaki et al. | |
| 2006/0113857 A1 | 6/2006 | Honkura et al. | |
| 2007/0024144 A1 * | 2/2007 | Obidniak | 310/156.36 |
| 2007/0138890 A1 * | 6/2007 | Yu | 310/156.22 |

OTHER PUBLICATIONS

U.S. Appl. No. 11/896,454, filed Aug. 31, 2007, Young-Chun Jeung.

U.S. Patent Office Action, mailed Dec. 3, 2009, issued in corresponding U.S. Appl. No. 11/896,454.

U.S. Patent Office Action, mailed Feb. 22, 2010, issued in corresponding U.S. Appl. No. 11/896,454.

* cited by examiner

ROTOR OF BRUSHLESS DIRECT CURRENT MOTOR HAVING SOUND ABSORBING RESIN PORTION

CROSS-REFERENCE TO RELATED APPLICATIONS

This application is a U.S. divisional application filed under 35 USC 1.53(b) claiming priority benefit of U.S. Ser. No. 11/896,454 filed in the United States on Aug. 31, 2007 now abandoned, which claims earlier priority benefit to Korean Patent Application No. 10-2007-0045977 filed with the Korean Intellectual Property Office on May 11, 2007, the disclosure of which is incorporated herein by reference.

BACKGROUND OF THE INVENTION

1. Field of the Invention

One or more aspects of the embodiments discussed herein relates to a rotor of a brushless direct-current (hereinafter, referred to as "BLDC") motor, and more particularly, to a rotor of an BLDC motor, which can prevent electromagnetic vibration and noise generated between a rotor and an armature from being transferred to a rotary shaft of the rotor during the motor driving to thereby minimize motor noise and can reduce the weight of the rotor to thereby maximize a motor's power-to-weight ratio.

2. Description of the Related Art

Generally, a conventional rotor of a brushless direct-current (BLDC) motor uses a permanent magnet and a rotor core is necessarily combined with a rotor shaft using a ferromagnetic body or an electric steel sheet in order to form a magnetic circuit of the permanent magnet.

However, when the permanent-magnet rotor generates a rotation torque due to its interaction with a rotating magnetic field of an armature, electromagnetic cogging generated in an air gap between the rotor and the armature, torque ripple, or vibration caused by the interaction of electromagnetism is directly transferred to the rotor shaft and may be then transferred to the load side or may be amplified, thereby causing severe mechanical noise such as resonance noise.

Figure 1A:
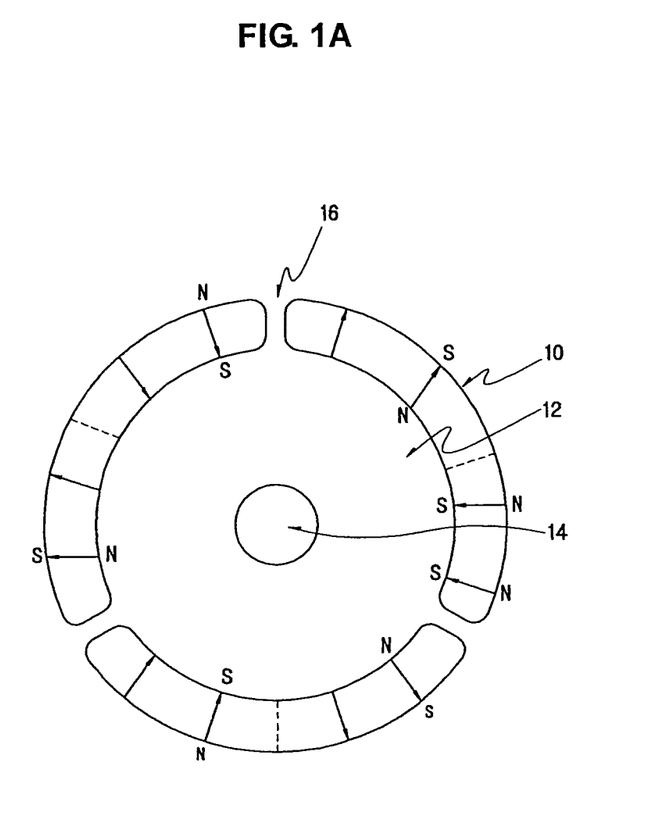
FIGS. 1A and 1B illustrate the structure of a rotor of a conventional BLDC motor.
Figure 1B:
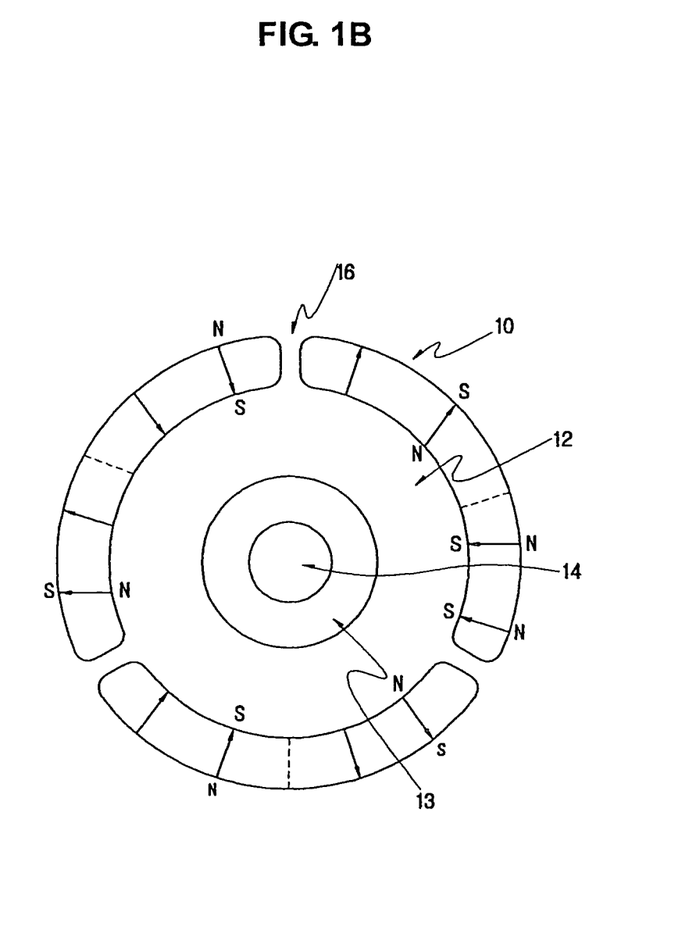

An explanation of the rotor structured as described above will be in detail given. FIGS. 1A and 1B illustrate the structure of a rotor of a conventional BLDC motor, and FIG. 2 illustrates a magnetic circuit of a rotor and an armature 5 of a conventional BLDC motor.

As illustrated in FIGS. 1A and 1B, the rotor of the conventional BLDC motor has a structure in which a radially magnetized C-type permanent magnet 10 is attached to the outer circumferential face of an electric steel sheet ferromagnetic core portion 12 made of a ferromagnetic iron core or armature and a rotor shaft 14 is inserted into a central portion of the ferromagnetic core portion 12.

The C-type permanent magnet 10 is an anisotropic magnet that is magnetized radially around the center of the rotor shaft 14. In order to form a magnetic circuit 102 with a different pole of the rotor, the C-type permanent magnet 10 has to have a ferromagnetic material such as pure iron or an electric steel sheet core provided on its inner circumferential face in FIG. 2.

Figure 2:
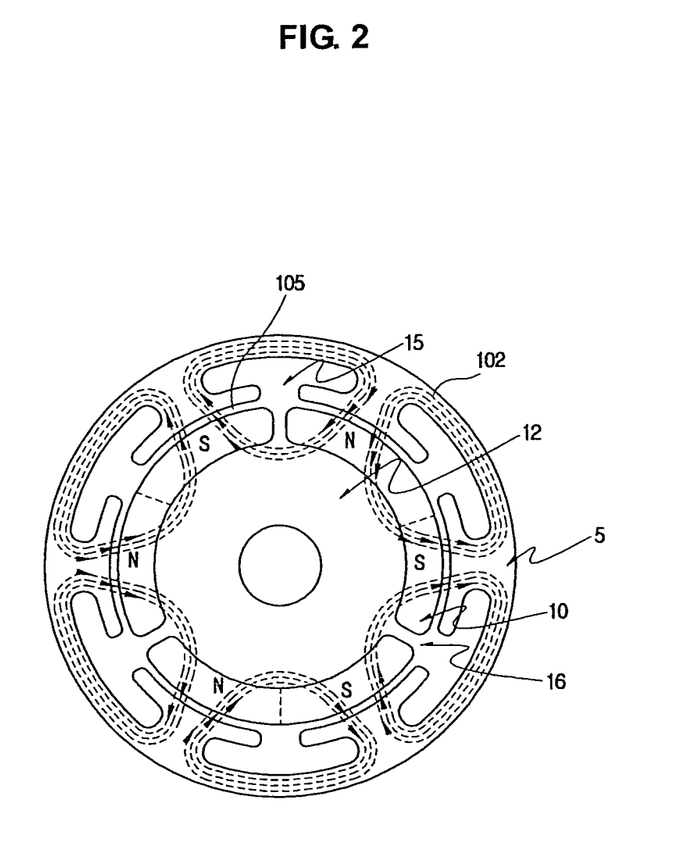
FIG. 2 illustrates a magnetic circuit of the rotor and an armature of the conventional BLCD motor.

When the rotor in which the ferromagnetic core portion 12 and the C-type permanent magnet 10 are combined with each other is assembled onto the center of the armature 5, the magnetic circuit 102 through which flux flows is formed as illustrated in FIG. 2. When the pole shift of the armature 5 occurs in magnetic coupling of the formed magnetic circuit 102, the rotor rotates due to interaction torque of a rotating magnetic field.

At this time, vibration caused by unbalance among magnetic flux densities of an air gap 105, a slot portion 15 of the armature 5, and a gap portion 16 of the permanent magnetic 10 of the rotor and magnetizing vibration caused by pole shift of the armature 5 are transferred to the ferromagnetic core portion 12 and a rotor shaft 14 through the permanent magnetic 10. Such vibration is directly transferred up to a load side through the rotor shaft 14, thereby amplifying mechanical vibration noise or causing resonance noise during the motor driving and increasing stress in a bearing while aggravating bearing noise, thus reducing the expected life span of a motor.

In order to reduce vibration noise of the rotor of the conventional BLDC motor, a sound-absorbing resin portion 13 such as rubber or silicon resin is inserted between the ferromagnetic core portion 12 and the rotor shaft 14, thereby blocking noise and vibration transferred through the permanent magnetic 10 and the ferromagnetic core portion 12, as illustrated in FIG. 1B.

In this case, however, the use of the ferromagnetic core portion 12 having a specific area is inevitable in order to minimize resistance between the armature 5 and the magnetic circuit 102 of the C-type permanent magnet 10, as illustrated in FIG. 2.

Moreover, the use of the magnetic core portion 12 cannot greatly reduce a weight of the rotor and the magnetic core portion 12 still acts as a medium through which cogging torque ripple, noise, or vibration generated in the rotor is transferred. As a result, the use of the sound-absorbing resin portion 13 around the rotor shaft 14 for blocking vibration has a limitation in blocking noise and vibration.

Furthermore, for the conventional permanent magnet rotor, in order to combine the C-type permanent magnet 10 with the ferromagnetic core portion 12, a high-strength adhesive has to be used and the weight balance of the rotor may be broken during adhesion between at least two pieces divided from the C-type permanence magnet 10.

The conventional BLDC motor has to use an electric steel sheet core so as to maintain the maximum magnetic flux density of the permanent magnet rotor and to minimize a loss of a rotating electric field. As a result, cogging torque vibration due to interaction with an armature core and electromagnetic vibration noise of the rotating magnetic field are unavoidably transferred to a load side through the motor rotary shaft.

SUMMARY OF THE INVENTION

Accordingly, an aspect of the embodiments discussed herein has been made in view of the above-mentioned problems occurring in the prior art, and it is an object of the present invention to provide a rotor of a BLDC motor, in which a permanent magnet of the rotor is formed integrally in a ring shape as one piece and has a magnetic circuit therein, thereby removing a need for a ferromagnetic for a separate magnetic circuit through which the magnetic flux of the permanent magnet can pass.

It is another aspect of the embodiments discussed herein to provide a rotor of a BLDC motor, which can be made of a non-magnetic material or a plastic material, thereby blocking motor noise and vibration transferred through the rotor, reducing unnecessary weight and improving motor's" power-to-weight ratio and operating efficiency.

It is yet another aspect of the embodiments discussed herein to provide a rotor of a BLDC motor, which can prevent a permanent magnet of the rotor from being damaged by the thermal expansion of a sound-absorbing material that is formed inside the cylindrical permanent magnet in order to block noise.

To accomplish the above aspects, according to the embodiments discussed herein, there is provided a rotor of a brushless direct current (BLDC) motor, including: a cylindrical polar anisotropic permanent magnet for allowing a magnetized magnetic path to run therethrough; a high-strength core portion mounted on in the inner side of the polar anisotropic permanent magnet; and a sound-absorbing resin portion mounted on the inner side of the high-strength core portion.

According to an aspect of the embodiments discussed herein, the thickness of the high-strength core portion is 40-100% of that of the polar anisotropic permanent magnet.

Another aspect of the embodiments discussed herein, the high-strength core portion is formed of any one of non-magnetic metal, aluminum having a low thermal expansion coefficient, alloy, or high-strength engineering plastic.

BRIEF DESCRIPTION OF THE DRAWINGS

The above and other aspects, features and advantages of the embodiments discussed herein will be apparent from the following detailed description of the preferred embodiment of the invention in conjunction with the accompanying drawings, in which.

DETAILED DESCRIPTION OF THE PREFERRED EMBODIMENTS

Reference will now be made in detail to the embodiments, examples of which are illustrated in the accompanying drawings, wherein like reference numerals refer to the like elements throughout. The embodiments are described below by referring to the figures.

Figure 3:
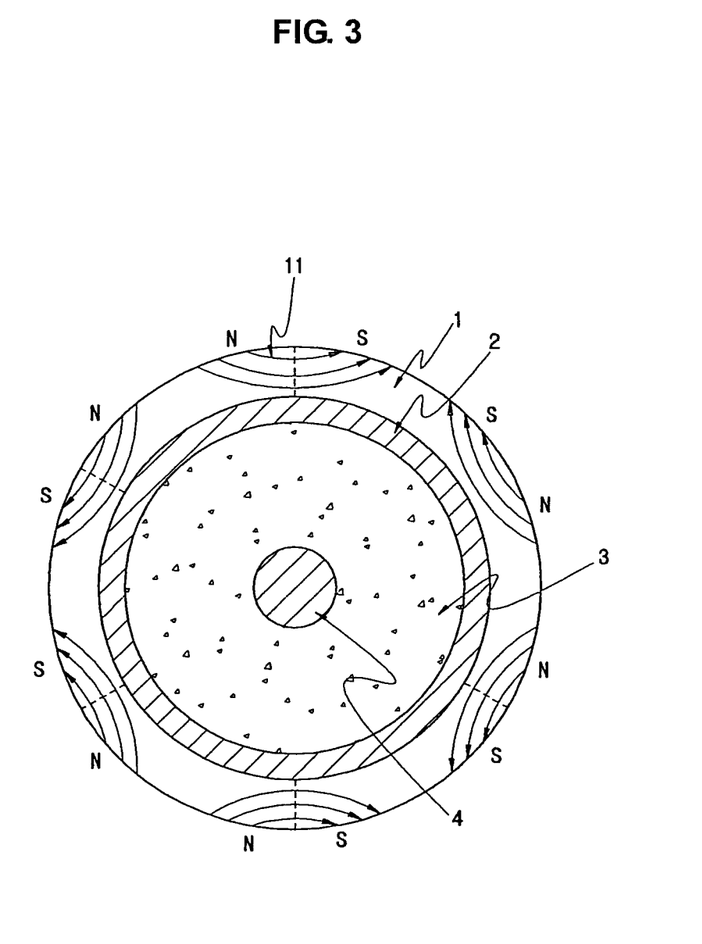
FIG. 3 illustrates the structure of a rotor of a BLDC motor according to the embodiments discussed herein.

FIG. 3 illustrates the structure of a rotor of a BLDC motor. As illustrated in FIG. 3, the rotor includes a cylindrical permanent magnet 1 and a cylindrical high-strength core portion 2 made of aluminum having a very low thermal expansion coefficient, alloy, or high-strength engineering plastic, which is adhered to the inner circumferential portion of the permanent magnet 1.

It is preferable that in an embodiment the thickness of the high-strength core portion 2 can be 40-100% of that of the permanent magnet 1.

In the rotor of an embodiment, the cylindrical high-strength core portion 2 is inserted and adhered to an inner circumferential portion of the polar anisotropic permanent magnet 1, a sound-absorbing resin portion 3 made of rubber or sound-absorbing resin such as silicon resin is inserted and adhered to the inner circumferential portion of the high-strength core portion 2 to a thickness that can be two times that of the cylindrical high-strength core portion 2, and a rotor shaft 4 is inserted into the center of the sound-absorbing resin portion 3.

For the high-strength core portion 2, a high-strength material having superior heat-resisting property and a low thermal expansion coefficient is used, so as to prevent the cylindrical permanent magnet 1 from being damaged by the thermal expansion of the high-strength core portion 2 or the thermal expansion of the sound-absorbing resin portion 3.

The permanent magnet 1 used for the rotor of an embodiment is a cylindrical polar permanent magnet formed as one piece. The permanent magnet 1 used in the present invention may be a polar anisotropic permanent magnet, through which a magnetized magnetic path runs.

Figure 4:
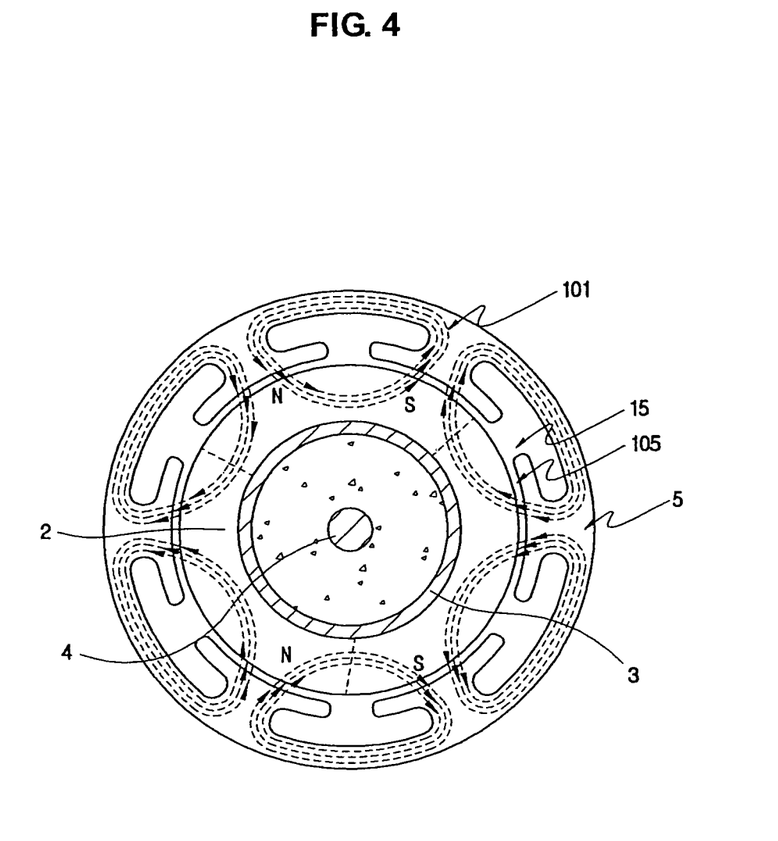
FIG. 4 illustrates a magnetic circuit of the rotor and an armature of the BLCD motor according to an aspect of the embodiments discussed herein.

FIG. 4 illustrates a magnetic circuit 101 of the rotor 4 and an armature 5 of the BLCD motor of an embodiment. The rotor 4 of an embodiment includes the magnetic circuit 101 in which a flux flow 11 is formed within the cylindrical permanent magnet 1 as illustrated in FIG. 4.

Figure 5:
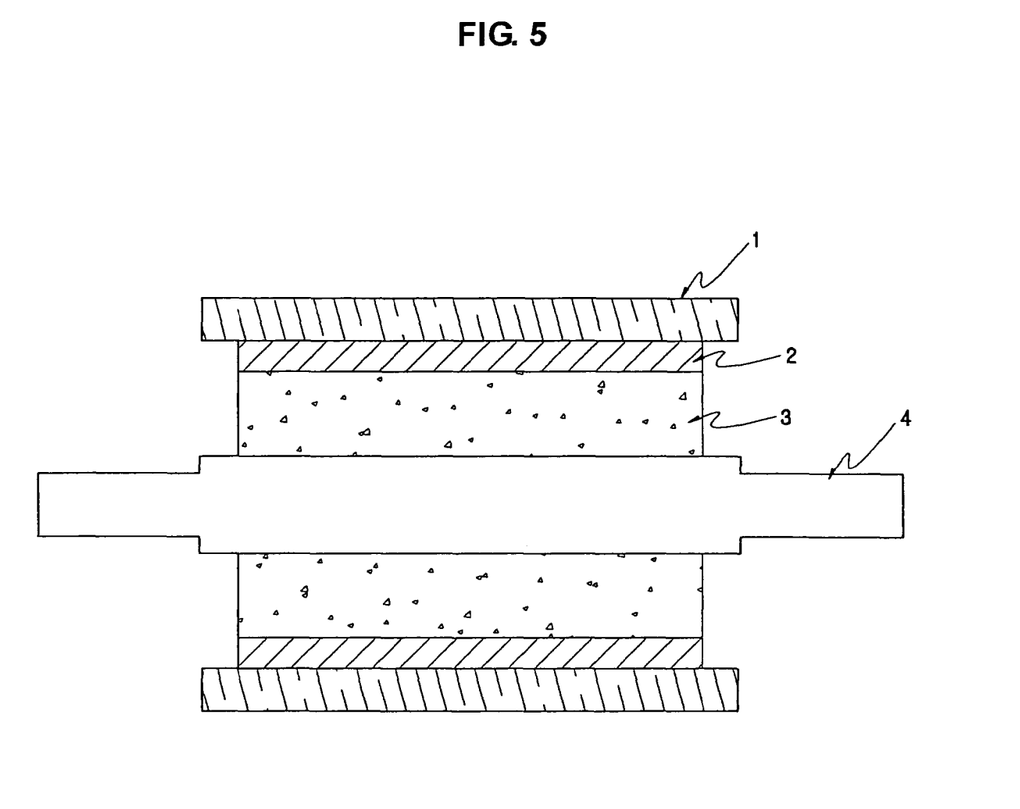
FIG. 5 is a cross-sectional view showing the rotor of the BLDC motor according to an aspect of the embodiments discussed herein.
Figure 6:
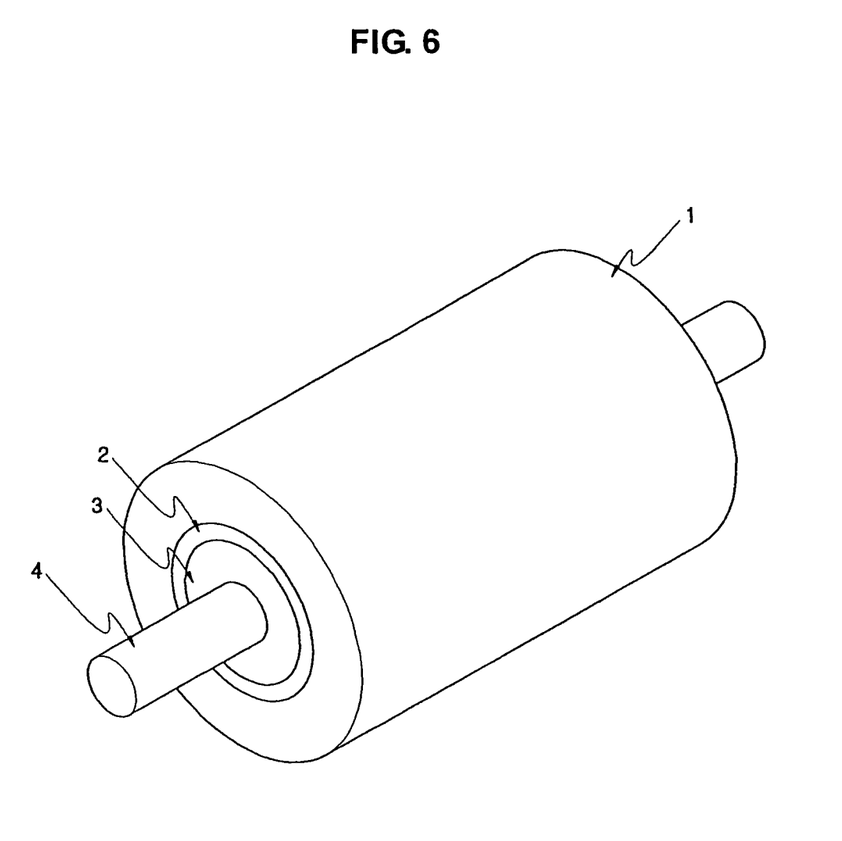
FIG. 6 is a perspective view showing the rotor of the BLDC motor according to an aspect of the embodiments discussed herein.

FIG. 5 is a cross-sectional view showing the rotor of the BLDC motor of an embodiment, and FIG. 6 is a perspective view showing the rotor of the BLDC motor of an embodiment.

As illustrated in FIGS. 5 and 6, the rotor of an embodiment is completed by assembling the cylindrical polar anisotropic permanent magnet 1, the cylindrical high-strength core portion 2 in the inner circumferential portion of the permanent magnet 1, the sound-absorbing resin portion 3 in the inner circumferential portion of the high-strength core portion 2, and the rotor shaft 4 in the center of the sound-absorbing resin portion 3.

Figure 7A:
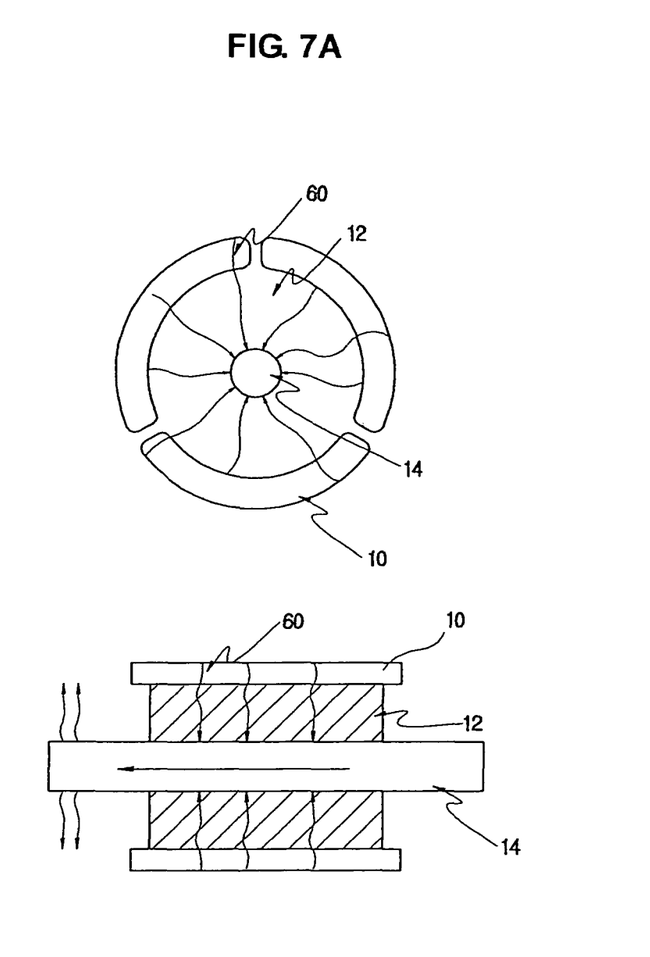
FIGS. 7A through 7C are views showing comparison between a conventional technique and an aspect of the embodiments discussed herein in order to explain the effects of the present invention.
Figure 7B:
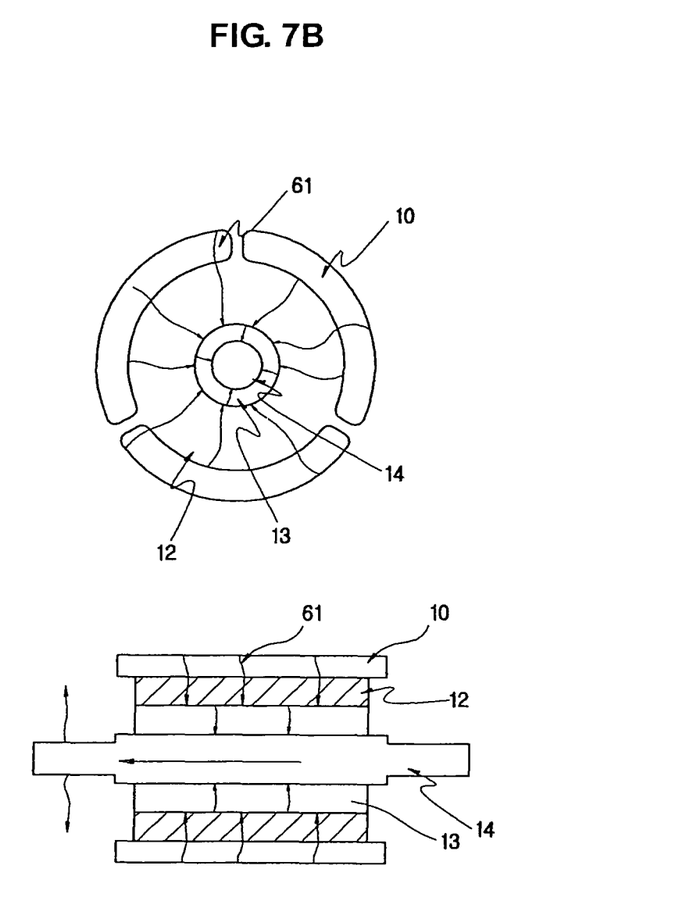
Figure 7C:
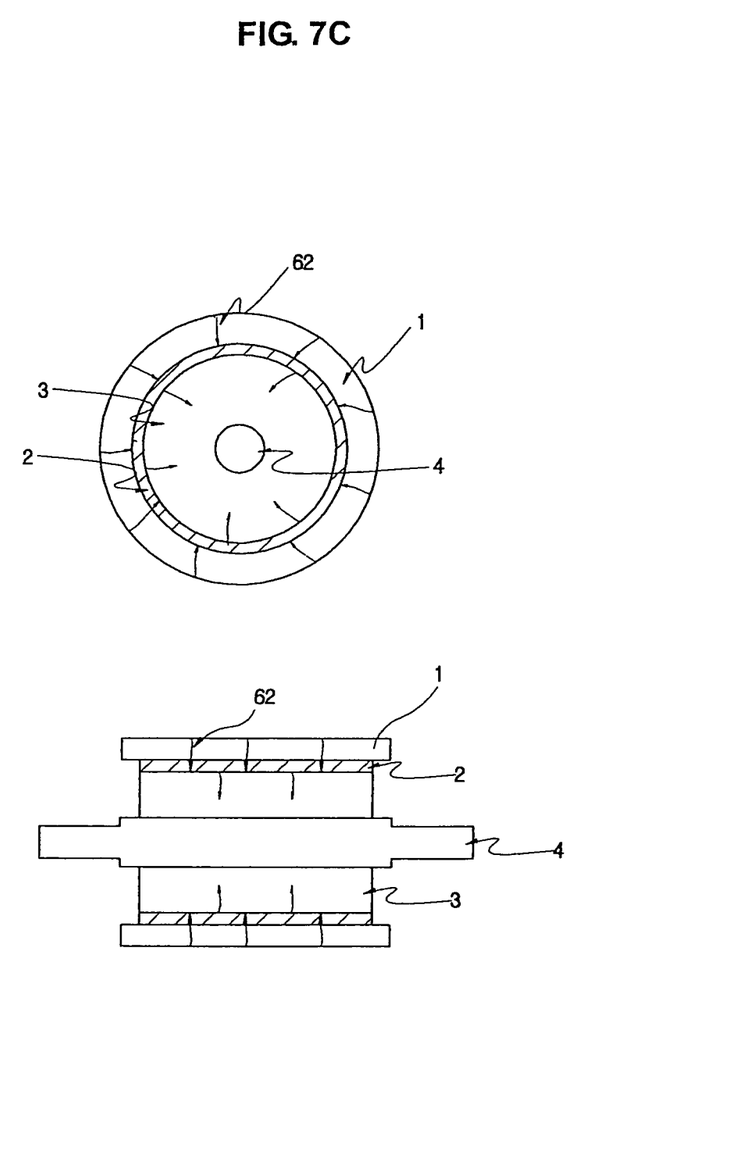

FIGS. 7A through 7C are views showing comparison between a conventional technique and an embodiment in order to explain the effects of the embodiment. The amount of vibration transferred to the rotor shaft 14 through a conventional permanent magnet rotor as indicated by 60 of FIG. 7A or 61 of FIG. 7B is very large.

On the other hand, the rotor according to an embodiment uses the cylindrical polar anisotropic permanent magnet 1 formed as one piece, and a non-magnetic metal or high-strength plastic layer is primarily formed and a sound-absorbing resin or sound-absorbing material layer is secondarily formed in the inner circumferential portion of the rotor, thereby greatly reducing the weight of the BLDC motor.

In other words, by reducing vibration and noise of a rotating magnetic field, which are transferred to the rotor shaft 4 through the rotor as indicated by 62 of FIG. 7C, by a large amount, mechanical noise and vibration in the motor and the load side can be reduced, contributing to the extension of the life span of a bearing, the motor, and the load side.

The rotor according to an embodiment has the magnetic field 101 in which the flux flow 11 is formed inside the cylindrical permanent magnet 1, without a need to form the path of the magnetic circuit 101 in the permanent magnet 1 using a separate ferromagnetic as illustrated in FIG. 3.

Consequently, the high-strength core portion 2 made of a non-magnetic material or plastic that is light and has superior vibration/noise blocking property and the sound-absorbing resin portion 3 made of sound-absorbing plastic resin or other sound-absorbing materials can be used sufficiently in an inner circumferential space of the polar anisotropic permanent magnet 1, and noise and vibration generated in the air gap 105 between the armature 5 and the permanent magnet 1 can be prevented from being transferred to the rotor shaft 14.

As set forth in the foregoing, the rotor according to an embodiment uses the cylindrical polar anisotropic permanent magnet, and a non-magnetic metal or high-strength plastic layer is primarily formed and a sound-absorbing resin or sound-absorbing material layer is secondarily formed in the inner circumferential portion of the rotor, thereby greatly reducing the weight of the BLDC motor.

Moreover, by reducing vibration and noise of the rotating magnetic field transferred to the rotary shaft through the rotor by a large amount, mechanical noise and vibration in the motor and the load side can be greatly reduced and the expected life span of the bearing, the motor, and other load sides can be extended.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A rotor of a BLDC (brushless direct current) motor, comprising:
    a cylindrical polar anisotropic permanent magnet formed in a single body for allowing a magnetized magnetic path to run therethrough;
    a cylindrical core portion mounted on the inner side of the polar anisotropic permanent magnet, the core portion being formed of any one of non-magnetic metal or engineering plastic to protect the polar anisotropic permanent magnet against thermal expansion of the core portion and the thickness of the core portion being 40-100% of that of the polar anisotropic permanent magnet;
    a cylindrical resin portion mounted on the inner side of the core portion and having a thickness that is two times that of the core portion, the cylindrical resin portion having a constant outer diameter so as not to impede axial expansion of the polar anisotropic permanent magnet and the core portion; and
    a rotor shaft installed in the center of the resin portion,
    wherein the core portion prevents the polar anisotropic permanent magnet from being broken due to thermal expansion of the resin portion and the resin portion absorbs the noise and vibration generated from an air gap between an armature and a permanent magnet of a rotor to prevent the noise and vibration from being transferred to the rotor shaft.

* * * * *